(No Model.)
D. Y. HALLOCK.
POTATO DIGGER.
No. 515,120. Patented Feb. 20, 1894.
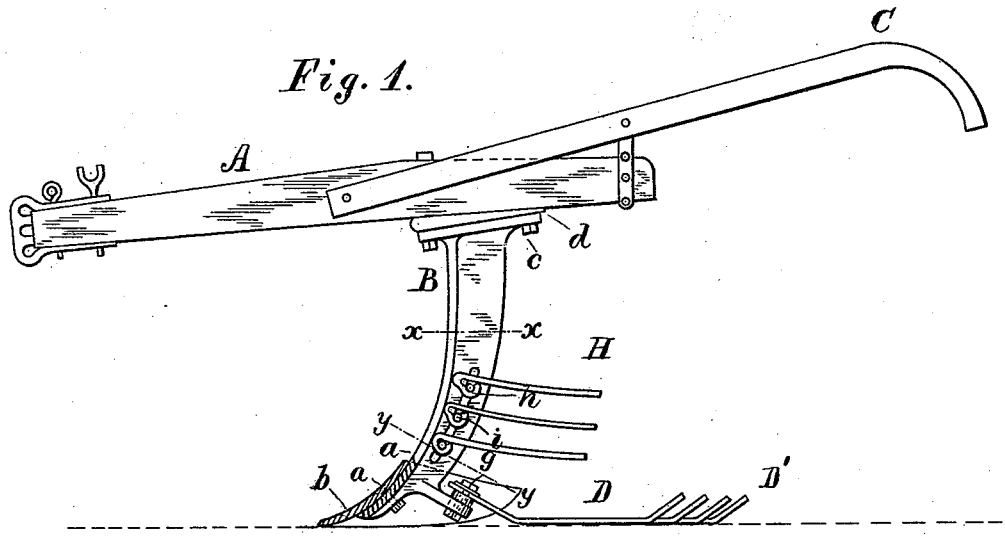
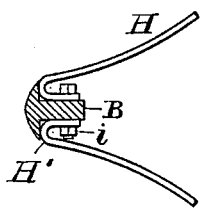 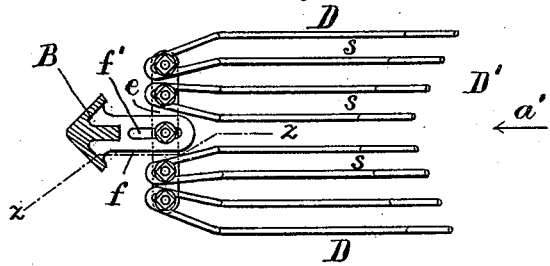
Attest:
L. Lee
Edw. F. Kinsey
Inventor.
D. Y. Hallock, per
Crane & Miller, Attys.

UNITED STATES PATENT OFFICE.

DANIEL Y. HALLOCK, OF SOUTHOLD, NEW YORK.

POTATO-DIGGER.

SPECIFICATION forming part of Letters Patent No. 515,120, dated February 20, 1894.

Application filed January 23, 1893. Serial No. 459,378. (No model.)

*To all whom it may concern:*

Be it known that I, DANIEL Y. HALLOCK, a citizen of the United States, residing at Southold, Suffolk county, New York, have invented certain new and useful Improvements in Potato-Diggers, fully described and represented in the following specification and the accompanying drawings, forming a part of the same.

The object of this invention is to furnish an improved construction for a potato digger whereby the soil can be divided and partly worked in the rear and partly at the sides of the digger, and is an improvement on a former Patent, No. 376,086, granted to me January 10, 1888, which sought the same end, by providing for the passage of the surface soil, vines, and trash to the rear while the lower stratum of soil was thrown sidewise by lateral rods secured to the shovel.

With my former construction it was found that the vines and trash passing to the rear upon the screen (as then constructed) were a serious hinderance to the working of the digger, which is entirely overcome in the present construction, by providing for an unobstructed passage of the lower stratum of soil and tubers to the rear screen; while the surface soil, tubers, vines and trash are thrown to each side by means of the lateral rods.

In the present construction the screen is arranged to drag upon the ground, and is secured to the standard instead of to the shovel as heretofore; and I also provide lateral rods secured adjustably to the standards, whereby the space between the rear edge of shovel and lateral rods can be varied to suit the different varieties of soil, and the different conditions of the same soil, as to moisture or dryness. There is thus provision for an unobstructed passage of the lower portion of the soil to the screen in the rear, and in such quantity as the capacity of the screen will admit.

My present invention also furnishes a means of attaching the screen adjustably to the standard; by which it serves as a bottom or shoe to the digger, and also serves when required, to change the suction or penetration of the shovel.

It also provides means for varying the inclination of the plow beam to alter the draft of the implement.

The invention will be understood by reference to the annexed drawings, in which—

Figure 1 is a side elevation of the digger with the shovel in section at the center line, and the nearer half of the screen removed. Fig. 2 is a cross section on line $x$, $x$, in Fig. 1, showing the connection of the fingers with the standard. Fig. 3 is a plan of the screen with the standard and shovel in section on line $y$, $y$, in Fig. 1. Fig. 4 shows the rear end of the screen viewed in the direction of the arrow $a$ in Fig. 3.

A is the beam, B the standard and C the handles attached to the beam. To vary the draft, a wedge $d$ is inserted between the head of the standard and the under side of the beam A, and held in place by the bolts $c$. It is obvious that the reversal of the wedge tends to vary the inclination of the beam, while the removal of the wedge produces an intermediate adjustment.

B is the shovel attached to the standards $a$. A slot $h$ is formed in the standard just above the top of the shovel, and fingers H are secured to the standard by bolts $i$ passed through the slot. The fingers, as shown in Fig. 2, are reflexed at their forward ends H' to fit beneath the head of the bolts $i$, and are curved backwardly and outwardly from the standards to engage the surface earth which slides over the top of the shovel. The fingers may be adjusted to and from the shovel by means of the slot $h$, and may also be tipped in any direction around the bolt $i$, and may thus be adjusted to suit the condition of the soil. Three of the fingers H are shown in Fig. 1 upon one side of the standard, and a similar number would be used upon the opposite side, or any other number that may be found desirable.

The screen D consists in a series of rods attached to a head $e$, which is bolted at its middle to an inclined lug $f$ projected from the rear side of the standard. The lug, as shown in Fig. 3, is provided with a slot $f'$, and the head is secured adjustably therein by a bolt $g$. The rods forming the screen are sloped downwardly from the head and thence extended horizontally to drag upon the ground. The rods are of increasing length from the center to outside of screen so that when the ends are turned upward, the rear end of the screen has a wedge shaped surface like the shovel b. The screen operates to support the entire implement when in use, as it rests in the bottom of the furrow that is produced by the shovel b, and it is obvious that it may be adjusted during construction, or its relation to the shovel altered, by moving the head e backward or forward upon the lug f; as the the inclination of the lug thus raises or lowers the screen and serves to set the bottom of the screen higher or lower in relation to the shovel. With this construction the lateral fingers co-operate with the screen, by throwing the surface soil and vines to each side while the tubers and lower soil pass onto the screen, where the traction of the soil below causes the soil on the screen to be forced through the upturned ends of the rods, as the implement is drawn forward, and the tubers are thus effectively separated from the soil without a possibility of injury to the tubers.

The wedge form given to the rear end of the screen operates to force the earth sidewise, and potatoes which would otherwise fall through and be covered more or less with the earth, are thus worked sidewise and discharged off of the screen upon the top of the ground.

The shovel, not having any rods or fingers attached to its rear edge, scours much more readily in any soil as it loosens and freely conveys the soil and tubers over upon the rear screen, where the separation is effectively accomplished.

It will be observed that none of the sifting devices is attached to the shovel B, and it may therefore be detached from the standard for renewal or repairs, without deranging the fingers H or the screen D.

By reflexing the forward ends H' of the fingers, the heads of the bolts i are covered by the fingers and are thus prevented from catching in the vines and thus permit them to slide smoothly over the fingers.

Having thus set forth the nature of my invention, what I claim herein is—

1. In a potato digger, the combination, with a standard having a shovel secured detachably to its forward side of the screen consisting in the parallel series of rods secured detachably to the transverse head e, the head being secured detachably to the lower part of the standard and the rods being extended backwardly as described and bent to form a wedge-shaped surface, as set forth.

2. In a potato digger, the combination, with a standard having a shovel attached to its forward side, of the slotted lug f inclined downwardly from its rear side, the transverse head e attached to the lug, and the screen d consisting in the rods attached to the head and extended backward parallel to one another with their rear ends inclined upwardly as described to form a wedge shaped surface, substantially as set forth.

3. In a potato digger, the combination, with the standard B having the slot h and having the shovel b attached to its forward side, of fingers attached to the standard above the shovel by a bolt extended through the slot and thus adjustable toward the shovel and at various angles to the standard, as set forth.

4. In a potato digger, the combination, with the standard B provided with the slot h and having the shovel b attached to its forward side, of the fingers H attached to the standard by bolts i within the slot and reflexed at their forward ends H' over the ends of the bolts, as and for the purpose set forth.

5. In a potato digger, the combination, with a standard having a shovel attached to its forward side, of a screen adapted to drag upon the ground in the rear of the standard, and fingers H attached adjustably to the standard above the screen, as set forth.

In testimony whereof I have hereunto set my hand in the presence of two subscribing witnesses.

DANIEL Y. HALLOCK.

Witnesses:
WM. A. COCHRAN,
J. EDWIN COCHRAN.